United States Patent Office 3,129,266
Patented Apr. 14, 1964

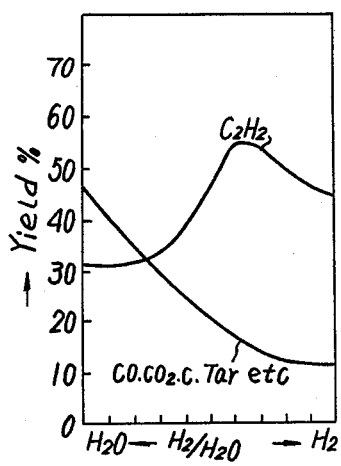
Fig-1-
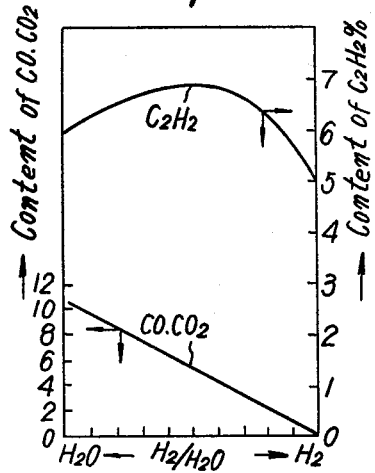
Fig-2-
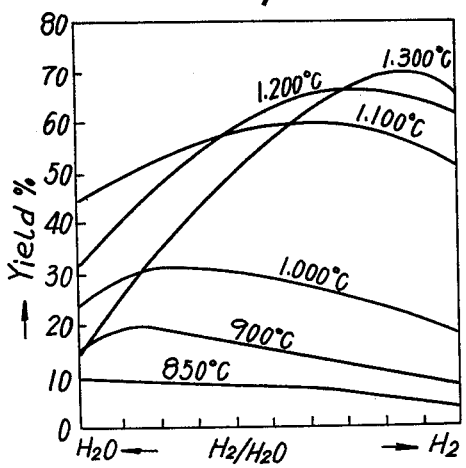
Fig-3-
Taiseki Kunugi and
Naoki Negishi
INVENTORS
BY Wenderoth, Lind
and Ponack,
Attorneys

3,129,266
PROCESS FOR PRODUCTION OF ACETYLENE BY THERMAL DECOMPOSITION OF HYDROCARBONS
Taiseki Kunugi and Naoki Negishi, both of Tokyo, Japan, assignors to Messrs. Kogyokaihatsu, Kenkyusho, Tokyo, Japan
Filed Mar. 14, 1962, Ser. No. 179,573
Claims priority, application Japan Sept. 11, 1961
1 Claim. (Cl. 260—679)

This invention relates to the process for the production of acetylene by the thermal decomposition of hydrocarbons. More particularly, it relates to the production of acetylene by the thermal decomposition of hydrocarbons with an increased yield and a high concentration of acetylene.

The feature of this invention is characterized by the use of co-operative diluent consisted of the mixture of hydrogen and steam.

It has been hitherto proposed in the art to carry out the decomposition of hydrocarbons for the production of acetylene, by employing either reduced pressure process or diluting process in order to prevent or suppress the undesirable side recations which unavoidably occur during the decomposition reaction. Because of comparatively high temperature usually required for the decomposition of hydrocarbons especially on making acetylene, the reaction often tends to go wild, or become uncontrollable, and this results in the formation of a great deal amount of undesirable by-products such as carbon and tarry materials.

In the diluting method, hydrogen is particularly known to be a most effective diluent, and the presence of which is capable of preventing resulted acetylene either from the further decomposition or from the conversion into carbon or tarry materials thus giving a relatively high yield of desired acetylene. However, this method has entailed major disadvantages in the low concentration of acetylene in product gas mixture. On the other hand, when steam is used as a diluent, although it has advantage in easy separation of steam from the product gas simply by the condensation giving relatively high concentration of acetylene therein, it simultaneously entails fairly large amount of various by-products, for example, oxygen-containing compounds such as carbon monoxide and carbon dioxide. In addition to this, the amount of undesirable carbon and tarry materials are largely increased thereby lowering the acetylene yield.

Therefore, none of these methods was satisfactory and commercially impractical for producing acetylene from hydrocarbons.

The object of this invention is to provide an improved and efficient process whereby the yield and concentration of acetylene are greatly increased with the formation of remarkably reduced amount of such undesirable oxygen-containing by-products as well as carbon and tarry materials.

We have now discovered, as a result of extensive researches, that acetylene can be obtained at greatly increased yield by employing both hydrogen and steam as diluting gas for the decomposition of hydrocarbons, whereby the formation of oxygen-containing products such as carbon monoxide and carbon dioxide and the accumulation of carbon and tarry materals are markedly reduced in comparison with the results obtained when each of them was employed solely as a diluent. Such co-operative effect or synergistic effect of hydrogen with steam as diluent or synergistic effect of hydrogen with steam as diluent composition have never been expected before and is amazing so that it increases the yield of acetylene far more than that attained by any other diluents as shown above. Moreover the resulted acetylene is easily separated and recovered as concentrated state from the product gas mixture simply by removing the water by the condensation of steam contained therein.

The effect and merits of the process of this invention will be more clearly understood from the illustrative description hereinafter set forth by showing a part of the results obtained by the experiments in which methane was used as a feedstock, the proportion of diluent added to feed methane was about 3.2 (mol ratio), and the reaction temperature being at 1,400° C.

In the accompanying drawings, FIG. 1 illustrates the relationship between the yields of products and the ratio of hydrogen to steam used as diluent. As is evident from the plotted curves therein, the rate of methane conversion into acetylene (the ratio of methane converted into acetylene to the feed methane) takes its maximum point indicating 55% conversion which is far greater than that when either hydrogen alone i.e., 45%, or steam alone, i.e., 31%, is used as diluent. While the rate of conversion to by-products such as carbon monoxide, carbon dioxide, free carbon and tarry materials is as low as 13% which is far less than that when steam alone is used, i.e., as high as 46%, and not greatly differs from the result obtained by the use of hydrogen alone which amounting to 12%. FIG. 2 also illustrates the relationship between the composition of decomposed gas from which steam has been removed by condensation, and the proportional amount of hydrogen to steam in the diluent. The condition used is the same as in FIG. 1. In this instance, the content of acetylene reaches its peak of 6.9% by volume at the ratio of 50 mol percent hydrogen to 50 mol percent steam, prevailing over either value obtained by using hydrogen (5.0% by volume) or steam (6.0% by volume) individually as a diluent.

The optimum ratio of hydrogen to steam in the diluent, whereby maximum yield of acetylene is attainable, will widely vary depending upon the reaction temperatures and the type or kind of feed hydrocarbons used. When n-heptane, for example, is used as a feed hydrocarbon, the correlation between the rate of n-heptane converted into acetylene to the n-heptane fed and the ratio of hydrogen to steam, taking temperature as a parameter, is as shown in FIG. 3. Referring to the diagram, the optimum mixing ratio of hydrogen to steam, at which the highest acetylene yield is obtained, is 85:15 at 1,300° C., 70:30 at 1,200° C., 55:45 at 1,100° C., 25:75 at 1,000° C. and 15:85 at 900° C. At temperature as low as 850° C., the intermixing or synergistic effect can not be observed any more.

As is noted from above results, the optimum ratio of hydrogen to steam in the diluent mixture to give maximum yield of acetylene will vary depending upon the reaction temperature and the type of hydrocarbon feedstock used, however, the preferred ratio by which said intermixing effect is appreciable to carry out the process of this invention is usually within the range of from 10:90 to 90:10.

The preferable reaction temperatures for carrying out the process of this invention usually range above 850° C., since said effect is lost at the temperatures below 850° C. The hydrogen and steam which are employed as diluent components in this invention are not necessarily pure, but they may be more or less contaminated or admixed with a certain amount of some impurities without causing any substantial defects.

The hydrocarbon feed-stocks for use in the practice of this invention are those of natural or synthetic or similar hydrocarbons including normally gaseous hydrocarbons with one or more carbon atoms, normally liquid hydrocarbons such as pentane, heptane, gasoline, naphtha, light oil, kerosene, heavy oil and crude oil or mixture of thereof.

The decomposition reaction of this invention may be carried out using a regenerative type furnace, a pebble-heater type furnace and the like.

According to the process of this invention, acetylene can be produced at high yield and at relatively concentrated state from hydrocarbon feedstocks by carrying out the thermal decomposition under the dilution with hydrogen-steam gas mixture while effectively preventing the formation of undesirable by-products which include oxygen-containing products such as carbon monoxide and carbon dioxide as well as carbon and tarry materials.

The practice of this invention is further illustrated by the following specific examples.

Example 1

Methane was decomposed at 1400° C. using hydrogen together with steam as diluent mixture. The results obtained at the optimum time of contact by which the highest acetylene yield is accomplished are shown in the following table:

| Ratio of hydrogen to steam in the diluent ($H_2:H_2O$) | 100:0 | 67:33 | 49:51 | 0:100 |
|---|---|---|---|---|
| Contact time (second) | 0.041 | 0.022 | 0.019 | 0.016 |
| The contents (Vol. percent) of each component present in the decomposed gas mixture after the removal of steam by condensation: | | | | |
| Acetylene | 4.98 | 6.72 | 6.89 | 6.00 |
| Ethylene | 0.90 | 0.37 | 0.40 | 0.40 |
| Methane | 7.65 | 7.10 | 8.55 | 8.20 |
| CO and $CO_2$ | 0 | 2.77 | 5.20 | 10.53 |
| Hydrogen, etc. | 86.47 | 83.04 | 78.96 | 74.87 |
| The rate (percent) of methane converted into each product to the methane fed: | | | | |
| Acetylene | 44.9 | 55.0 | 45.9 | 31.0 |
| Ethylene | 8.1 | 3.0 | 2.7 | 2.1 |
| Methane | 34.5 | 28.9 | 28.5 | 21.1 |
| By-products, e.g., CO, $CO_2$, carbon, tars, etc. | 12.5 | 13.1 | 22.9 | 45.8 |

Example 2

N-heptane was decomposed at 1200° C. using three types of diluents for the purpose of comparison; the first type consisted of hydrogen alone: the second type steam alone: the last one the mixture of both steam and hydrogen at the ratio of 77.5 mol percent hydrogen at 22.5 mol percent steam. The proportion of the diluent used to n-heptane fed was about 28.

The results obtained were as follows:

| Diluents | Hydrogen alone | Hydrogen + Steam | Steam alone |
|---|---|---|---|
| Contact time (second) | 0.024 | 0.023 | 0.021 |
| The contents (Vol. percent) of each component present in the decomposed gas mixture after the removal of steam by condensation: | | | |
| Acetylene | 7.15 | 9.24 | 15.50 |
| Ethylene | 1.05 | 0.73 | 1.55 |
| Methane | 5.78 | 6.76 | 18.51 |
| CO and $CO_2$ | 0 | 0.90 | 10.45 |
| Hydrogen, etc. | 86.02 | 82.37 | 53.99 |
| The rate (percent) of n-heptane converted into each product to the n-heptane fed: | | | |
| Acetylene | 60.5 | 66.2 | 34.4 |
| Ethylene | 8.9 | 5.2 | 3.4 |
| Methane | 24.4 | 24.2 | 20.5 |
| By-products, e.g., CO, $CO_2$, carbon, tars, etc. | 6.2 | 4.4 | 41.7 |

While certain representative embodiments and details have been shown for the purpose of illustrating the invention, it will be apparent to those skilled in this art that various changes and modifications may be made therein without departing from the spirit of this invention.

What is claimed is:

In a process for the production of acetylene by the regenerative thermal decomposition of hydrocarbons, the improvement wherein the hydrocarbon is mixed with a diluent consisting essentially of a mixture of hydrogen and steam, the molar ratio of hydrogen and steam being between 10:90 and 90:10, the so-obtained mixture of hydrocarbon and diluent being heated to a temperature above 850° C., thereby producing acetylene in high yields and concentrations.

References Cited in the file of this patent

UNITED STATES PATENTS

| | | |
|---|---|---|
| 2,751,424 | Hasche | June 19, 1956 |
| 2,838,584 | Tsutsumi et al. | June 10, 1958 |
| 2,912,475 | Krause et al. | Nov. 10, 1959 |
| 3,093,697 | Kasbohm et al. | June 11, 1963 |